US012663120B2

(12) United States Patent
Wee et al.

(10) Patent No.: US 12,663,120 B2
(45) Date of Patent: Jun. 23, 2026

(54) HIGH-PRESSURE FLUID STORAGE CONTAINER FIXING STRUCTURE FOR TRAILER LOADING

(71) Applicant: DUKSAN AETHERCT CO., LTD., Busan (KR)

(72) Inventors: Ho-Sun Wee, Busan (KR); Yong Rok Oh, Busan (KR); Hyeon Joon Jeong, Busan (KR)

(73) Assignee: DUKSAN AETHERCT CO., LTD., Busan (KR)

( * ) Notice: Subject to any disclaimer, the term of this patent is extended or adjusted under 35 U.S.C. 154(b) by 0 days.

(21) Appl. No.: 18/633,639

(22) Filed: Apr. 12, 2024

(65) Prior Publication Data

US 2025/0189083 A1 Jun. 12, 2025

(30) Foreign Application Priority Data

Dec. 6, 2023 (KR) ........................ 10-2023-0175888

(51) Int. Cl.
*F17C 13/08* (2006.01)

(52) U.S. Cl.
CPC .... *F17C 13/084* (2013.01); *F17C 2201/0109* (2013.01); *F17C 2201/032* (2013.01); *F17C 2201/035* (2013.01); *F17C 2205/0107* (2013.01); *F17C 2205/013* (2013.01); *F17C 2270/0171* (2013.01)

(58) Field of Classification Search
CPC ............ F17C 13/084; F17C 2201/0109; F17C 2201/032; F17C 2201/035; F17C 2205/0107; F17C 2205/013; F17C 2270/0171
USPC .......................................................... 220/581
See application file for complete search history.

(56) References Cited

U.S. PATENT DOCUMENTS 2,761,397 A * 9/1956 Holst ...................... B60P 3/055 280/837
3,479,043 A 11/1969 Piehl
4,784,399 A * 11/1988 Finn ...................... F17C 13/085 410/48
5,040,933 A 8/1991 Lee et al.
(Continued)

FOREIGN PATENT DOCUMENTS

DE 102020124252 A1 * 3/2022 ............ F17C 13/084
JP 2020-020430 A 2/2020
KR 10-2421415 B1 7/2022

OTHER PUBLICATIONS

English Machine Translation of DE-102020124252-A1 (Year: 2022).*

*Primary Examiner* — Laura E. Parker
(74) *Attorney, Agent, or Firm* — NKL LAW; Jae Youn Kim

(57) ABSTRACT

A high-pressure fluid storage container fixing structure for trailer loading according to the present invention includes, for fixing an array of containers including a plurality of high-pressure fluid storage containers arranged in parallel in a horizontal direction and stacked one or more in a vertical direction on a trailer, a main frame provided along the periphery of the trailer, and a fixing plate extending in an arrangement direction of the plurality of high-pressure fluid storage containers included in the array of containers, provided to simultaneously fix neck portions of the high-pressure fluid storage containers, and having both ends coupled to the main frame.

2 Claims, 7 Drawing Sheets

(56) References Cited

U.S. PATENT DOCUMENTS

| | | | | |
|---|---|---|---|---|
| 5,685,350 | A | 11/1997 | Chowdhury | |
| 11,629,822 | B1 | 4/2023 | Koonce et al. | |
| 2021/0237562 | A1* | 8/2021 | Sawai .................... | B60K 15/07 |

* cited by examiner

HIGH-PRESSURE FLUID STORAGE CONTAINER FIXING STRUCTURE FOR TRAILER LOADING

BACKGROUND OF THE INVENTION

Field of the Invention

The present invention relates to a high-pressure fluid storage container fixing structure for trailer loading, and more specifically, to a high-pressure fluid storage container fixing structure for trailer loading for safely fixing an array of containers including a plurality of high-pressure fluid storage containers arranged in parallel in a horizontal direction and stacked one or more in a vertical direction on a trailer.

Background Art

Fossil fuels, traditionally used as the primary energy source, are being exhausted over time, and have environmental pollution issues, so human attention is gradually shifting towards alternative energy sources.

Among the alternative energy sources, hydrogen fuel has attracted attention. Hydrogen is not only abundant but also free from environmental pollution concerns, thereby having a high potential.

In particular, researches on vehicles using hydrogen fuel as an alternative to conventional internal combustion engine vehicles are under way, and show promising results.

Accordingly, various studies on storage containers, which are equipped in vehicles and refueling stations to safely store hydrogen gas filled under high pressure are actively being conducted. In connection with the above studies, researches on a fixing structure of trailers for safely transporting hydrogen gas storage containers are also under way.

However, the conventional fixing structure of trailers for transporting hydrogen gas storage containers adopt a method of individually fixing the hydrogen gas storage containers not to move, resulting in prolonged loading and unloading time and increased transportation costs due to additional manpower.

Therefore, there is a demand for methods to address the problems.

PATENT LITERATURE

Patent Documents

Patent Document 1: Korean Patent No. 10-2421415

SUMMARY OF THE INVENTION

Accordingly, the present invention has been made to solve the above-mentioned problems occurring in the prior arts, and it is an objective of the present invention to provide a high-pressure fluid storage container fixing structure for trailer loading that can safely fix an array of containers stacked one or more in a vertical direction on a trailer as a unit, and conveniently perform the entire transportation process including loading and unloading.

The objectives of the present disclosure are not limited to those mentioned above, and other objectives not mentioned herein will be clearly understood by those skilled in the art from the following description.

To accomplish the above object, a high-pressure fluid storage container fixing structure for trailer loading according to the present invention, for fixing an array of containers including a plurality of high-pressure fluid storage containers arranged in parallel in a horizontal direction and stacked one or more in a vertical direction on a trailer, including: a main frame provided along the periphery of the trailer, and a fixing plate extending in an arrangement direction of the plurality of high-pressure fluid storage containers included in the array of containers, provided to simultaneously fix neck portions of the high-pressure fluid storage containers, and having both ends coupled to the main frame.

Moreover, the high-pressure fluid storage container fixing structure further includes: a first auxiliary angle provided at an upper side of the fixing plate in the extension direction of the fixing plate to provide reinforcing force; and a second auxiliary angle provided at a lower side of the fixing plate in the extension direction of the fixing plate to provide reinforcing force.

Here, a first pipe fixing channel is formed inside the first auxiliary angle such that a pipe through which a predetermined fluid flows is placed therein, and a second pipe fixing channel is formed inside the second auxiliary angle such that a pipe through which a predetermined fluid flows is placed therein.

Furthermore, the first pipe fixing channel is opened upward, and the second pipe fixing channel is opened downward.

Additionally, the high-pressure fluid storage container fixing structure further includes a support unit provided between the first auxiliary angle of the container array located at a lower side and the second auxiliary angle of the container array located at an upper side to provide supporting force.

In this instance, the support unit includes: a first support plate providing support in the direction where the high-pressure fluid storage containers are located; and a second support plate spaced apart from the first support plate by a predetermined distance, providing support in the opposite direction where the high-pressure fluid storage containers are located.

In addition, a lower portion of the first support plate and a lower portion of the second support plate are coupled to the first auxiliary angle of the container array located at the lower side, and an upper portion of the first support plate and an upper portion of the second support plate are coupled to the second auxiliary angle of the container array located at the upper side.

The high-pressure fluid storage container fixing structure for trailer loading according to the present invention for solving the above-described problem can conveniently perform the entire transportation process including loading and unloading by fixing the array of containers including a plurality of high-pressure fluid storage containers arranged in parallel in a horizontal direction and stacked one or more in a vertical direction on a trailer as a unit, as well as improve the overall safety during the work process.

Particularly, the high-pressure fluid storage container fixing structure for trailer loading of the present invention has the simple structure including: the main frame provided along the periphery of the trailer; and the fixing plate extending in the arrangement direction of the plurality of high-pressure fluid storage containers included in the container array, provided to fix the neck portions of the high-pressure fluid storage containers at the same time, and having both ends coupled to the main frame, thereby reducing manufacturing costs.

The advantages of the present disclosure are not limited to the above-mentioned advantages, and other advantages, which are not specifically mentioned herein, will be clearly understood by those skilled in the art from the following description.

DETAILED DESCRIPTION OF THE PREFERRED EMBODIMENT

Figure 1:
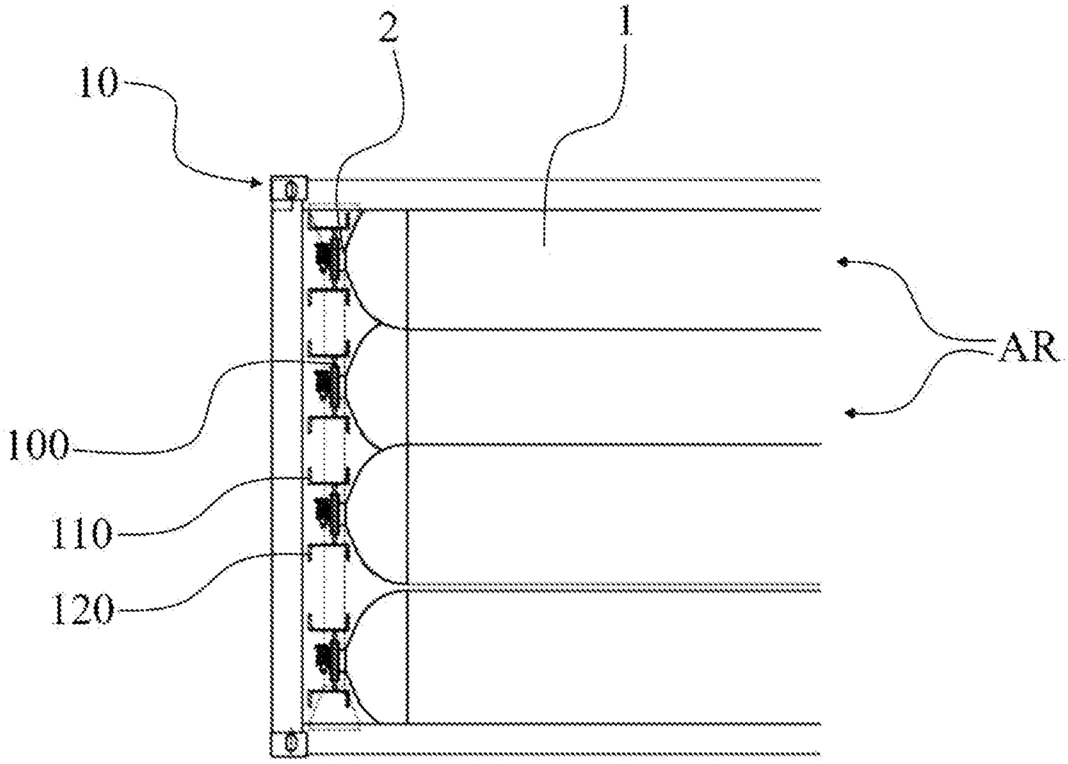
FIGS. 1 and 2 are diagrams illustrating a high-pressure fluid storage container fixing structure for trailer loading according to a first embodiment of the present invention.

In this specification, when it is mentioned that any component (or area, layer, part, etc.) is "on," "connected to," or "coupled to" another component, it means that any component can be directly positioned/connected/coupled on another component or a third component may be positioned between them.

The same reference numerals denote the same components. Additionally, in the drawings, the thickness, proportions, and dimensions of the components are exaggerated for effective description of the technical content.

The term "and/or" includes any and all combinations of the associated components that may be defined.

Terms such as "first," "second," etc., may be used to describe various components, but the components mentioned above should not be limited by the terms. The terms are used only to distinguish one component from another. For example, without departing from the scope of the present invention, the first component may be named the second component, and similarly, the second component may also be named the first component. The singular form includes the plural form unless explicitly different in context.

Furthermore, terms such as "below," "lower side," "above," "upper side," etc., are used to describe the relationships of components illustrated in the drawings. The terms are relative concepts and are described based on the direction indicated in the drawings.

Unless otherwise defined, all terms (including technical and scientific terms) used in this specification have the same meaning as understood by those skilled in the art to which the invention belongs. In addition, terms such as those defined in general dictionaries should be interpreted to have meanings consistent with the meanings in the relevant context of the technology, and should be interpreted as having meanings consistent with the meanings in the ideal or overly formal sense, unless explicitly defined here.

The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Hereinafter, embodiments of the present invention will be described in detail with reference to the drawings.

Figure 2:
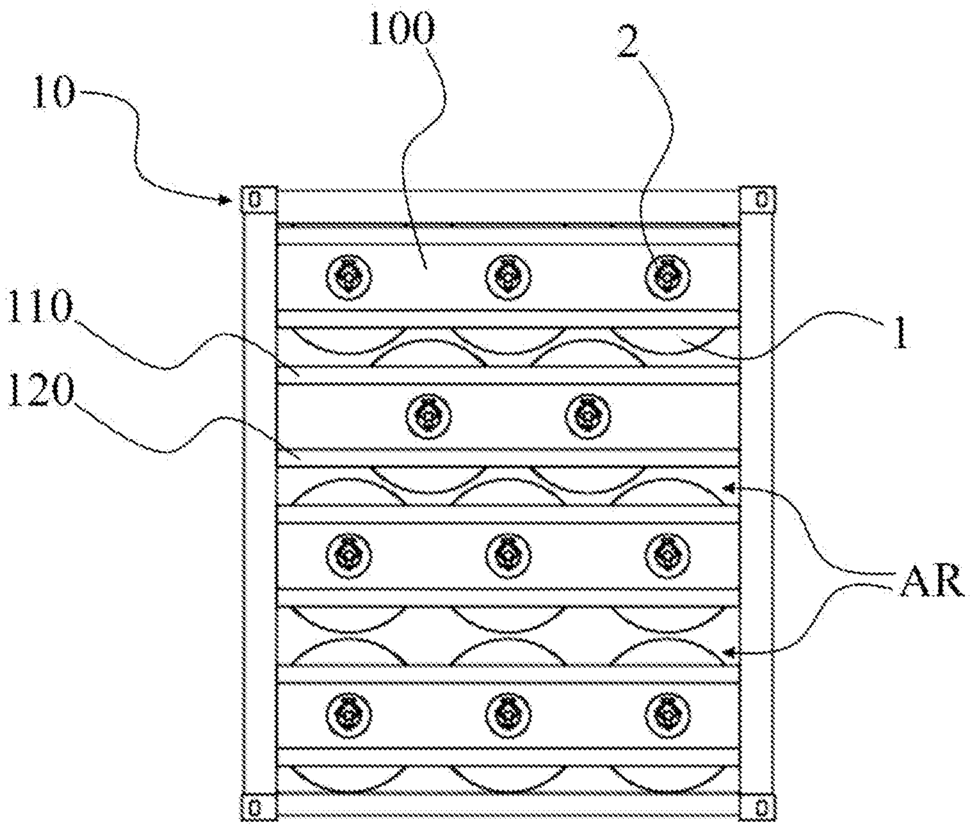

FIGS. 1 and 2 are diagrams illustrating a high-pressure fluid storage container fixing structure for trailer loading according to a first embodiment of the present invention.

Figure 3:
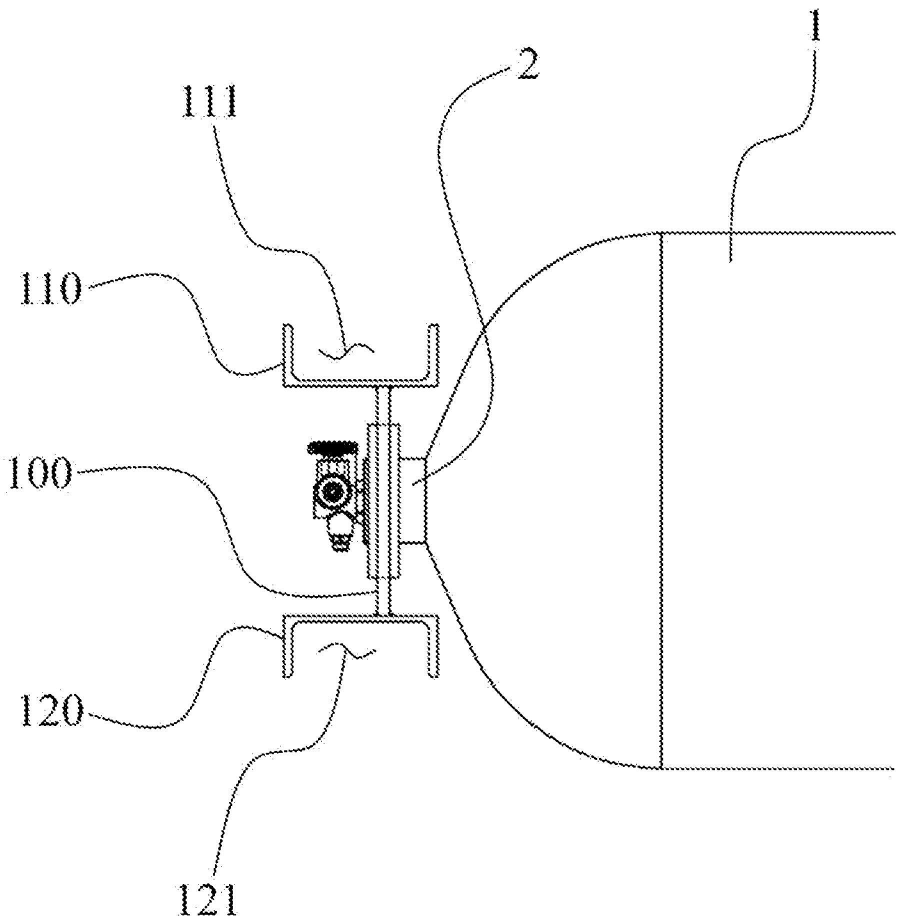
FIG. 3 is a diagram illustrating a detailed structure of the high-pressure fluid storage container fixing structure for trailer loading according to the first embodiment of the present invention.

Moreover, FIG. 3 is a diagram illustrating a detailed structure of the high-pressure fluid storage container fixing structure for trailer loading according to the first embodiment of the present invention.

The high-pressure fluid storage container fixing structure for trailer loading according to the first embodiment of the present invention can be installed on a trailer, which is a loading part of transport vehicle, to fix one or more container arrays AR stacked in the vertical direction in the trailer.

In this instance, the container array AR is a unit that includes a plurality of high-pressure fluid storage containers 1 arranged side by side in the transverse direction, and is a unit set up for ease of description.

As illustrated in FIGS. 1 to 3, the high-pressure fluid storage container fixing structure for trailer loading according to the first embodiment of the present invention includes a main frame 10, a fixing plate 100, a first auxiliary angle 110, and a second auxiliary angle 120.

The main frame 10 includes a vertical frame and a horizontal frame, is provided along the periphery of the trailer, and has a loading space formed therein for loading high-pressure fluid storage containers 1.

The fixing plate 100 extends in the arrangement direction of the plurality of containers 1 included in the container array AR, namely in the transverse direction, to simultaneously fix neck portions 2 of the plurality of high-pressure fluid storage containers 1.

Furthermore, both ends of the fixing plate 100 can be coupled to the vertical frame of the main frame 10 at a predetermined height.

In other words, the fixing plate 100 plays a role of simultaneously fixing and supporting each of the high-pressure fluid storage containers 1 arranged in one array of containers AR.

The first auxiliary angle 110 is a component provided at the upper side of the fixing plate 100 along the extension direction of the fixing plate 100 to provide a reinforcing force, and the second auxiliary angle 120 is a component provided at the lower side of the fixing plate 100 along the extension direction of the fixing plate 100 to provide a reinforcing force.

In the present embodiment, the first auxiliary angle 110 and the second auxiliary angle 120 are each formed to have a '⊏'-shaped longitudinal section, where a horizontally formed bottom plate is connected perpendicularly to provide a reinforcing force to the fixing plate 100.

In the case of the present embodiment, the first auxiliary angle 110 may have a first pipe fixing channel 111 formed on the inside, and the second auxiliary angle 120 may have a second pipe fixing channel 121 formed on the inside.

The first pipe fixing channel 111 and the second pipe fixing channel 121 can accommodate a pipe (not shown)

through which a fluid flows during the transportation process of the high-pressure fluid storage containers 1.

In this instance, the first pipe fixing channel 111 may be opened upward, and the second pipe fixing channel 121 may be opened downward.

That is, in the present embodiment, the front and rear directions of the first and second pipe fixing channels 111 and 121 are covered by side plates of the first and second auxiliary angles 110 and 120, thereby ensuring the safe protection of the pipes placed inside the first and second pipe fixing channels 111 and 121.

As described above, the present invention can conveniently perform the entire transportation process including loading and unloading by fixing the array of containers (AR) including a plurality of high-pressure fluid storage containers 1 arranged in parallel in a horizontal direction and stacked one or more in a vertical direction on a trailer as a unit, as well as improve the overall safety during the work process.

In particular, the high-pressure fluid storage container fixing structure for trailer loading according to the present invention can have a simple overall structure, thereby having an advantage of reducing manufacturing costs.

Till now, the first embodiment has been described in detail. Hereinafter, other embodiments of the present invention will be described. In the following description of each embodiment, a repeated description of components that are provided identically to the first embodiment will be omitted.

Figure 4:
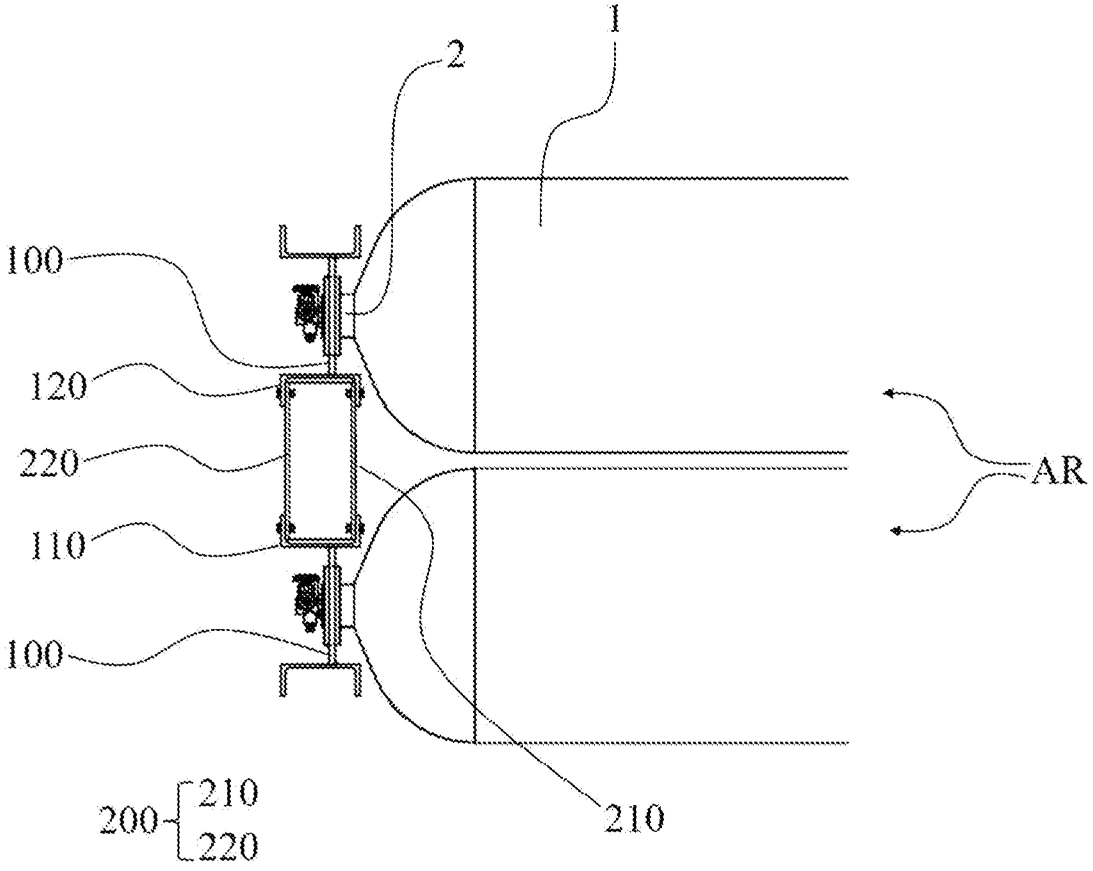
FIG. 4 is a diagram illustrating a detailed structure of a high-pressure fluid storage container fixing structure for trailer loading according to a second embodiment of the present invention.

FIG. 4 is a diagram illustrating a detailed structure of a high-pressure fluid storage container fixing structure for trailer loading according to a second embodiment of the present invention.

In the second embodiment of the present invention illustrated in FIG. 4, the high-pressure fluid storage container fixing structure for trailer loading according to the second embodiment of the present invention includes all the components mentioned in the first embodiment, and further includes a support unit 200.

The support unit 200 plays a role of providing a support force between the first auxiliary angle 110 of the array of containers (AR) located at the lower side and the second auxiliary angle 120 of the array of containers (AR) located at the upper side.

Specifically, in the present embodiment, the support unit 200 may include a first support plate 210 and a second support plate 220.

The first support plate 210 provides a support force from the direction where the high-pressure fluid storage container 1 is located, and the second support plate 220 is spaced apart from the first support plate 210 by a predetermined distance and provides a support force from the opposite direction to the direction where the high-pressure fluid storage container 1 is located with respect to the first support plate 210.

In this case, the lower portions of the first support plate 210 and the second support plate 220 can be coupled to the first auxiliary angle 110 of the array of containers (AR) located at the lower side, and the upper portions of the first support plate 210 and the second support plate 220 can be coupled to the second auxiliary angle 120 of the array of containers (AR) located at the upper side.

Accordingly, in the present embodiment, the region between the first auxiliary angle 110 of the array of containers (AR) located at the lower side and the second auxiliary angle 120 of the array of containers (AR) located at the upper side is completely covered by the first support plate 210 and the second support plate 220, so that the pipe installed inside the first pipe fixing channel 111 and the second pipe fixing channel 121 is not exposed to the outside, thereby improving safety.

Figure 5:
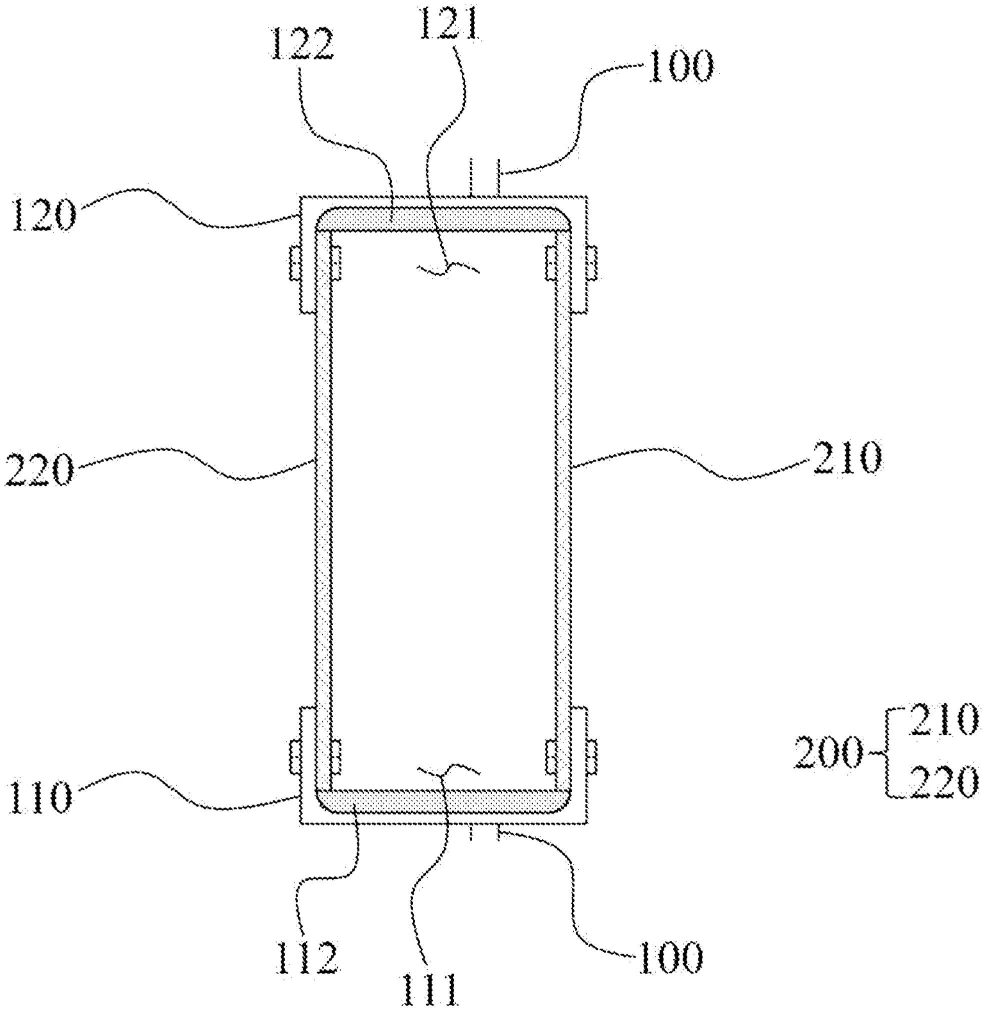
FIG. 5 is a diagram illustrating a support structure between container arrays in the high-pressure fluid storage container fixing structure for trailer loading according to the second embodiment of the present invention.

FIG. 5 is a diagram illustrating a support structure between arrays of containers in the high-pressure fluid storage container fixing structure for trailer loading according to the second embodiment of the present invention.

As shown in FIG. 5, on the inside of the first auxiliary angle 110 of the array of containers (AR) located at the lower side, an elastic first cushion member 112 may be provided to support the lower portions of the first support plate 210 and the second support plate 220.

Additionally, on the inside of the second auxiliary angle 120 of the array of containers (AR) located at the upper side, an elastic second cushion member 122 may be provided to be supported by the upper portions of the first support plate 210 and the second support plate 220.

In other words, the present embodiment can prevent the contact portions between the first auxiliary angle 110 and the first support plate 210 and the second support plate 220, and the contact portions between the second auxiliary angle 120 and the first support plate 210 and the second support plate 220 from being directly in contact and pressed or worn out through the first cushion member 112 and the second cushion member 122.

Figure 6:
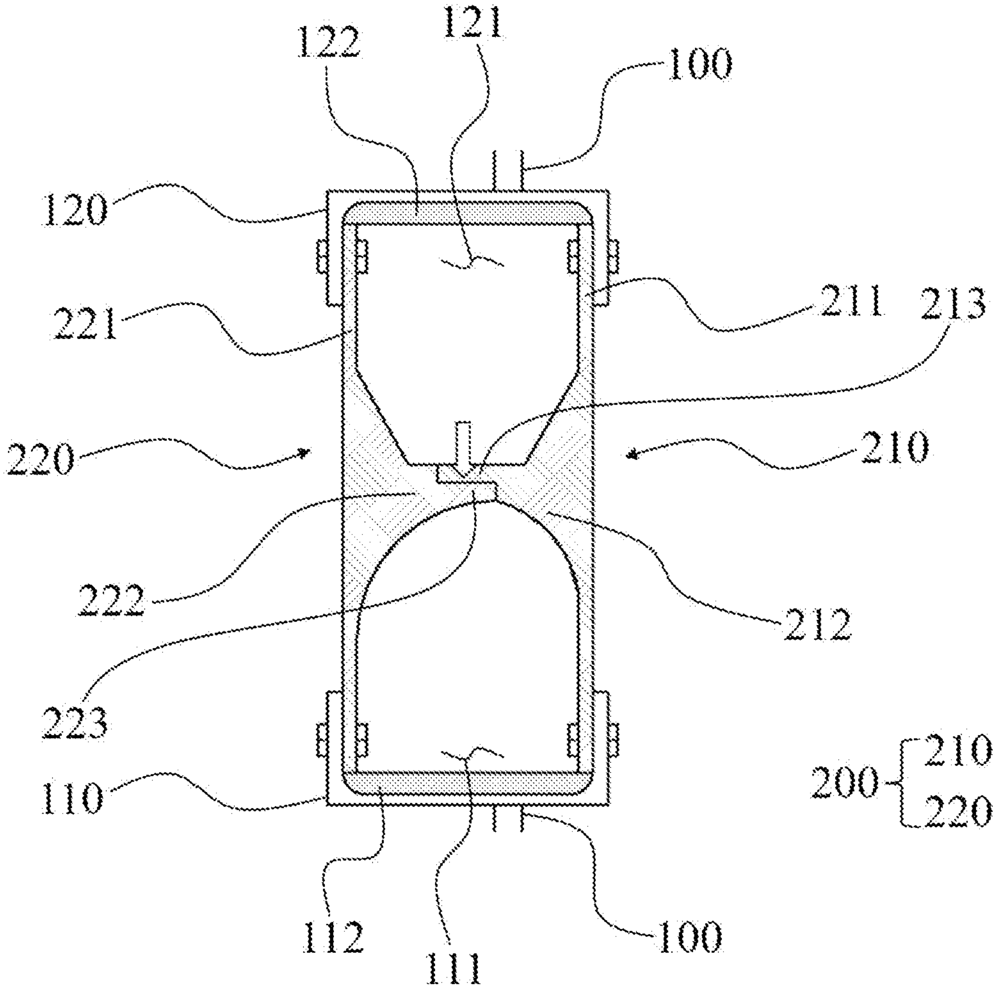
FIG. 6 is a diagram illustrating a support structure between container arrays in a high-pressure fluid storage container fixing structure for trailer loading according to a third embodiment of the present invention.

FIG. 6 is a diagram illustrating a support structure between container arrays in a high-pressure fluid storage container fixing structure for trailer loading according to a third embodiment of the present invention.

As shown in FIG. 6, the third embodiment of the present invention includes a support unit 200 provided between the first auxiliary angle 110 of the array of containers (AR) located at the lower side and the second auxiliary angle 120 of the array of containers (AR) located at the upper side to provide a support force, similar to the aforementioned second embodiment, and this support unit 200 may include a first support plate 210 and a second support plate 220.

Furthermore, in the present embodiment, a portion of the second support plate 220 is in contact with the first support plate 210 to provide supporting force relative to the first support plate 210.

The reason for doing so is that the first support plate 210 is closer to the high-pressure fluid storage container 1, so it receives a larger load from the array of containers (AR).

In other words, the second support plate 220 of the present embodiment can form a more stable support structure by dispersing the load applied to the first support plate 210.

For this purpose, in the present embodiment, the second support plate 220 may include a second support portion 221, a second extension portion 222, and a load support portion 223.

The second support portion 221 is provided to support the space between the first auxiliary angle 110 of the array of containers (AR) located at the lower side and the second auxiliary angle 120 of the array of containers (AR) located at the upper side.

Furthermore, the second extension portion 222 protrudes from the second support portion 221 towards the first support plate 210.

Also, the load support portion 223 protrudes further toward the first support plate 210 from the end of the second extension portion 222, and a step difference may be formed on the upper side with respect to the second extension portion 222.

Moreover, in the present embodiment, the first support plate 210 may include a first support portion 211, a first extension portion 212, and a load applying portion 213.

The first support portion 211 is provided to support the space between the first auxiliary angle 110 of the array of containers (AR) located at the lower side and the second auxiliary angle 120 of the array of containers (AR) located at the upper side.

And the first extension portion 212 protrudes in the direction of the second support plate 220 from the first support portion 211.

Also, the load application portion 213 protrudes further toward the second support plate 220 from the end of the first extension portion 212, and is placed on the upper side of the load support portion 223 of the second support plate 220 to apply a load to the load support portion 223. For this purpose, a step difference may be formed on the lower side of the load application portion 213 with respect to the first extension portion 212.

In other words, the first support plate 210 and the second support plate 220 are formed in an interlocking manner, and the load application portion 213 being seated on the upper side of the load support portion 223 can provide a structure for dispersing the load.

In the present embodiment, the lower surface of the first support plate 210 connected from the first support portion 211 to the first extension portion 212 to the load application portion 213, and the lower surface of the second support plate 220 connected from the second support portion 221 to the second extension portion 222 to the load support portion 223 may be formed in an arched shape in cross-section to provide strong resistance to the load.

Figure 7:
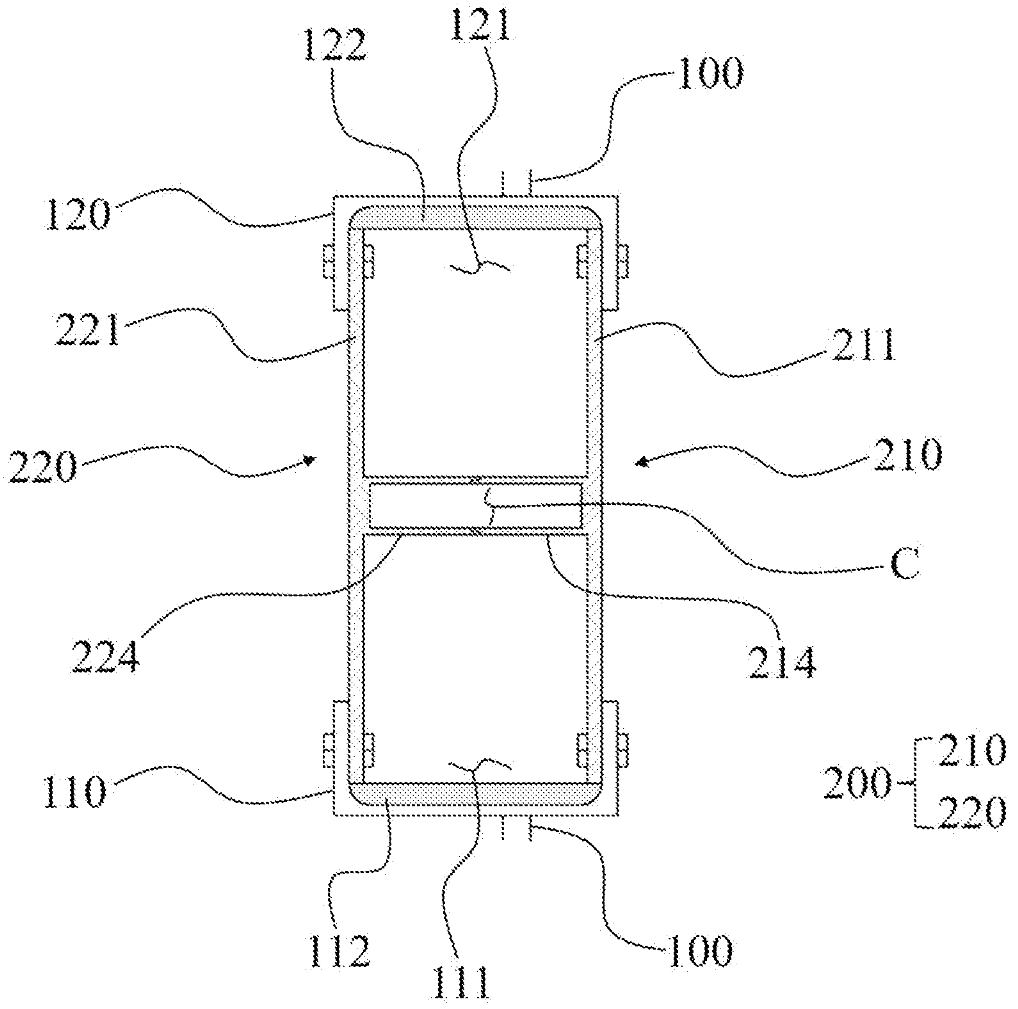
FIG. 7 is a diagram illustrating a support structure between container arrays in a high-pressure fluid storage container fixing structure for trailer loading according to a fourth embodiment of the present invention.

FIG. 7 is a diagram illustrating a support structure between container arrays in a high-pressure fluid storage container fixing structure for trailer loading according to a fourth embodiment of the present invention.

As shown in FIG. 7, the fourth embodiment of the present invention includes a support unit 200 provided between the first auxiliary angle 110 of the array of containers (AR) located at the lower side and the second auxiliary angle 120 of the array of containers (AR) located at the upper side to provide a support force, similar to the aforementioned second embodiment, and this support unit 200 may include a first support plate 210 and a second support plate 220.

Additionally, in the present embodiment, the first support plate 210 and the second support plate 220 form an auxiliary channel C which is separately partitioned between the first support plate 210 and the second support plate 220 and through which a refrigerant can flow.

For this purpose, in the present invention, the first support plate 220 may include a first support portion 211 and a first channel forming portion 214.

The first support portion 211 is provided to support the space between the first auxiliary angle 110 of the array of containers (AR) located at the lower side and the second auxiliary angle 120 of the array of containers (AR) located at the upper side.

Furthermore, the first channel forming portion 214 has a shape protruding from the first support portion 211 toward the second support plate 220, and a pair of the first channel forming portions 214 are vertically spaced apart from each other.

Moreover, in the present embodiment, the second support plate 220 may include a second support portion 221 and a second channel forming portion 224.

The second support portion 221 is provided to support the space between the first auxiliary angle 110 of the array of containers (AR) located at the lower side and the second auxiliary angle 120 of the array of containers (AR) located at the upper side.

Furthermore, the second channel forming portion 224 has a shape protruding from the second support portion 221 toward the first support plate 210, and a pair of the second channel forming portions 224 are vertically spaced apart from each other.

In this case, the first channel forming portion 214 and the second channel forming portion 224 have their ends in contact with each other to form an auxiliary channel (C) inside. For this purpose, a step for interlocking may be formed at the ends of the first channel forming portion 214 and the second channel forming portion 224.

As described above, the present embodiment has the auxiliary channel C separately partitioned between the first support plate 210 and the second support plate 220 and allowing the flow of the refrigerant, thereby effectively suppressing the temperature rise of the fluid flowing inside the pipes placed in the first pipe fixing channel 111 and the second pipe fixing channel 121, and the temperature rise in the loading space where the high-pressure fluid storage containers 1 are loaded.

As described above, while desirable embodiments of the present invention have been examined, it is understood by those skilled in the art that the present invention can be embodied in various specific forms without departing from the spirit or scope of the present invention. Therefore, the described embodiments should be considered as illustrative, not restrictive, and accordingly, the present invention can be modified within the scope of the appended claims and the equivalents.

What is claimed is:

1. A high-pressure fluid storage container fixing structure for trailer loading, comprising:

a main frame, including a vertical frame and a horizontal frame, configured to support container arrays, each container array including a plurality of high-pressure fluid storage containers arranged in parallel in a horizontal direction, wherein the container arrays include a first container array and a second container array located below the first container array;

fixing plates for each container array, each fixing plate extending in the horizontal direction and configured to simultaneously fix respective neck portions of the plurality of high-pressure fluid storage containers, opposite ends of each fixing plate being coupled to the main frame;

a first auxiliary angle disposed at an upper side of each fixing plate and a second auxiliary angle disposed at a lower side of each fixing plate, each auxiliary angle having a bottom plate extending perpendicularly from each fixing plate; and a support unit configured to support the first and second auxiliary angles, the support unit being disposed between the second auxiliary angle of the first container array and the first auxiliary angle of the second container array, wherein the first auxiliary angle of the second container array defines a first pipe fixing channel on an internal side thereof, and the second auxiliary angle of the first container array defines a second pipe fixing channel on an internal side thereof, wherein the first pipe fixing channel opens upward and the second pipe fixing channel opens downward, wherein the support unit includes a first support plate and a second support plate, which are spaced apart from each other, wherein upper ends of the first and second support plates are coupled to the second auxiliary angle of the first container array, and lower ends of the first and second support plates are coupled to the first auxiliary angle of the second container array, and wherein the first and second support plates are configured to cover a region between the second auxiliary angle of the first container array and the first auxiliary angle of the second container array.

2. The high-pressure fluid storage container fixing structure according to claim 1, wherein each of the first and second auxiliary angles includes a 'C'-shaped cross section.

* * * * *